Jan. 7, 1964     O. T. DAVIS     3,116,554
STRIPPING TOOL
Filed Dec. 1, 1961
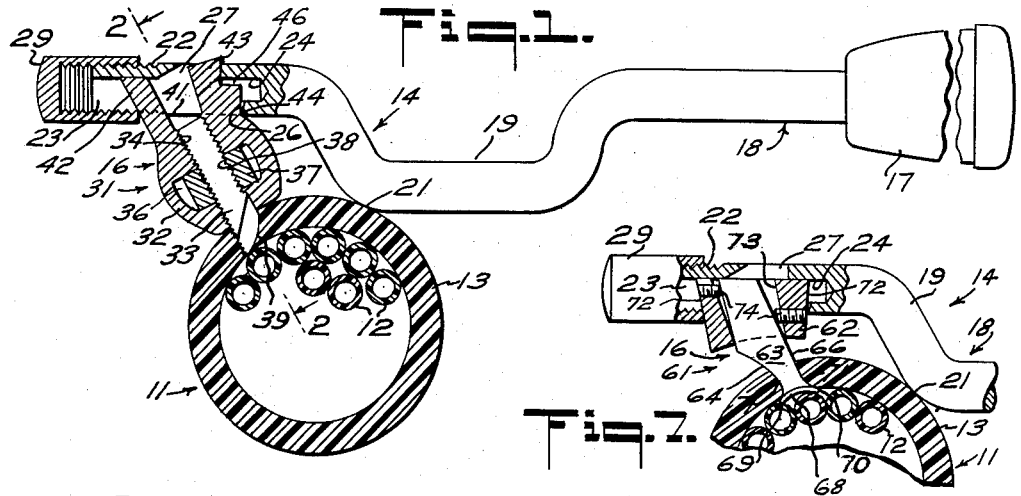
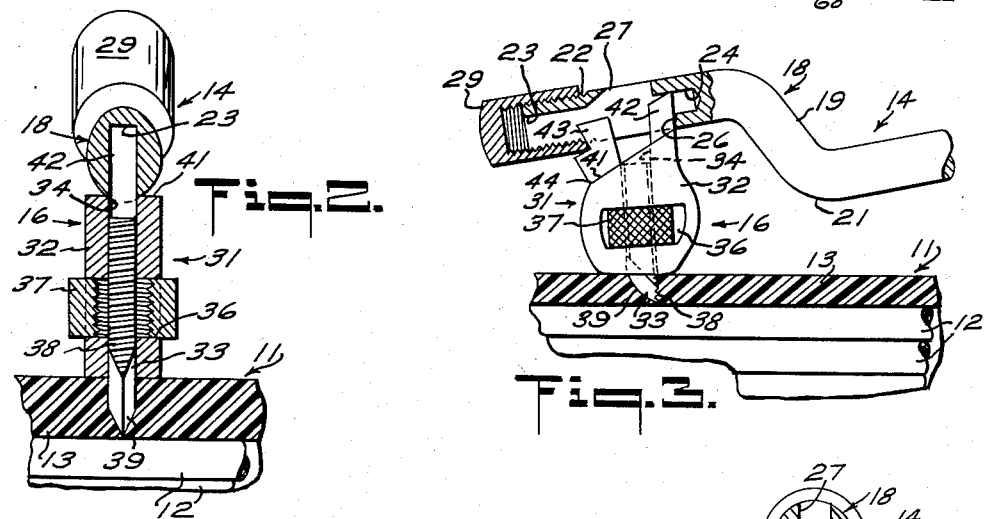
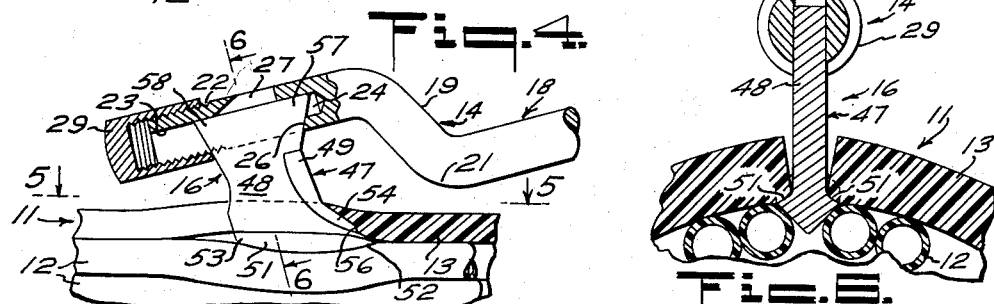
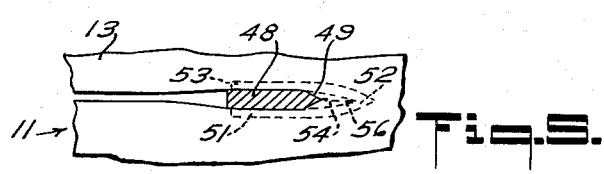
INVENTOR
ORLAND T. DAVIS
BY
Gardner & Zimmerman
ATTORNEYS

United States Patent Office 3,116,554
Patented Jan. 7, 1964

3,116,554
STRIPPING TOOL
Orland T. Davis, 6273 Arlington Blvd., Richmond, Calif.
Filed Dec. 1, 1961, Ser. No. 156,204
4 Claims. (Cl. 30—91)

This invention relates to stripping tools in general, and is particularly directed to a stripping tool for facilitating the ready removal of the sheath from multi-tube conduit.

Multi-tube conduit is extensively employed with air controlled apparatus to provide a plurality of separate fluid passages for supplying air to a corresponding plurality of parts which are moved or controlled by air pressure. In the installation and repair of the conduit it is of course necessary to remove sections of the conduit sheathing in order to afford access to the multiplicity of tubes enclosed therein. The problems of scoring and splitting the conduit sheath to facilitate its ready stripping are broadly analogous to those encountered with multi-conductor electrical cable wherein stripping of the outer insulating sheath is usually facilitated by a stripping tool. However, with multi-tube conduit, the inner tubes are presently fabricated from rubber, plastic, or the like such that they are relatively fragile. Therefore, in stripping the sheath from the conduit, extreme care must be exercised to prevent damage to the inner tubes. Hence unlike cable sheath stripping tools where contact of the relatively rugged inner conductors by the stripping blade can be tolerated, a stripping tool for multi-tube conduit must be designed to reduce to an absolute minimum the possibility of the cutting edge of the blade contacting the inner tube.

It is therefore an object of the present invention to provide a stripping tool which facilitates stripping of the outer sheath of multi-tube conduit without danger of damaging the relatively fragile inner tubes thereof.

Another object of the invention is to provide a multi-tube conduit stripping tool including a cutting blade which is readily adjustable in its depth of penetration into conduit sheathing.

Still another object of the invention is the provision of a stripping tool of the class described which facilitates easy and effective peripheral scoring as well as longitudinal cuts in the sheath of multi-tube conduit.

It is yet another object of the invention to provide a stripping tool of the class described having provision for interchangeable cutting blades one form of which is arranged to force inner tubes away from the sheath and to cut from the inside surface of the sheath outwardly therethrough during a cutting operation such that injury to the inner tubes is completely prevented.

It is a further object of the invention to provide a stripping tool of the class described which is simple and economical to manufacture.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is an elevational view of a stripping tool in accordance with the present invention as employed in making a peripheral scoring cut through the sheath of a multiple tube conduit and having portions cut away to more clearly illustrate the structure of the tool.

FIGURE 2 is an enlarged sectional view taken at line 2—2 of FIGURE 1 and illustrating particularly the construction of one form of cutting blade of the tool.

FIGURE 3 is a partial elevation view with portions broken away of the tool with the cutting blade positioned for making longitudinal cuts through a conduit sheath.

FIGURE 4 is a view similar to FIGURE 3, but with an alternative form of blade utilized with the tool to make longitudinal cuts through a conduit sheath.

FIGURE 5 is a sectional view taken at line 5—5 of FIGURE 4.

FIGURE 6 is a sectional view taken at line 6—6 of FIGURE 4.

FIGURE 7 is a view similar to FIGURE 3 illustrating a further modified form of blade utilized with the tool to make peripheral cuts through a conduit sheath.

Referring now to the drawing, a multi-tube conduit is indicated at 11 including a plurality of longitudinally oriented inner tubes 12, of plastic, rubber, or other relatively fragile material, enclosed within a cylindrical outer sheath 13 of plastic or the like. In the installation and repair of such conduit as employed, for example, to provide a plurality of separate passages through which air is conveyed to control various air actuated devices, it is frequently necessary to strip sections of the sheath from the conduit in order to afford access to the inner tubes. As previously indicated herein, formidable problems are posed in designing a stripping tool for this purpose. This is due to the extreme susceptibility of the fragile inner tubes, such as tubes 12, to damage during a sheath stripping operation. Unlike conventional stripping tools such as are employed to strip the insulating sheath from multi-conductor electrical cable, the blade of a stripping tool for use in multi-tube conduit stripping operations must be arranged such that it will not be brought into cutting engagement with the inner tubes during stripping of the sheath.

To the foregoing ends a stripping tool 14 is provided which includes cutting blade means 16 arranged to readily sever sheath 13, as well as the sheaths of other multi-tube conduit, while not damaging the fragile inner tubes 12 contained therein. The tool includes a handle 17, which is preferably hollow, from one end of which a rigid shank 18 projects. The shank is preferably formed with an offset portion 19 intermediate its length, the offset having a rounded corner defining a bearing heel 21 in the region thereof which is turned towards the axis of the shank proper to join the leading section of the shank. The leading end of the shank is arranged to releasably receive the cutting blade means 16.

The cutting blade means 16 may take several forms, and therefore it is preferable that in arranging the leading end of shank 18 to receive the blade means, consideration be given to interchangeability of blades. The leading end of the shank is therefore preferably externally threaded as indicated at 22 and provided with a longitudinally extending keyway 23. The keyway terminates in a shallow recess 24 from which the inner end edge of the keyway is forwardly inclined as shown at 26. In addition, a slot 27 extends radially through the shank to communicably terminate in the keyway. Such slot is disposed longitudinally intermediate the termination of the threads 22 and inner end of the keyway. An internally threaded cap 29 is then threadably engaged upon threads 22, the inner end of the cap being disposed longitudinally rearward of the termination of the forward edge of the slot 27 in the keyway when the cap is fully engaged.

Considering now several specific forms of the blade means 16 and the manner in which these forms may be interchangeably attached to the shank by means of the particular arrangement detailed above, one particularly advantageous blade arrangement is designated in FIGURES 1–3 by the numeral 31. This arrangement includes a carrier bracket 32 adapted for releasable engagement with the keyway 23, slot 27, and cap 29, the bracket, when engaged, depending from the leading end of the shank. A cutting blade 33 is carried by the bracket and protrudes from its lower end. It is particularly important to note that the blade is adjustably translatable within the bracket such that its amount of protrusion therefrom can be readily varied. Hence the amount of protrusion can be set exactly equal to the thickness of sheath 12. When the lower end of the bracket is supported on the exterior surface of the sheath, the blade thus penetrates only through the sheath and does not contact the inner tubes 12. Damage to the tubes during a stripping operation is consequently precluded.

To the foregoing ends, carrier bracket 32 is preferably of substantially rectangular block configuration with a longitudinal slot 34 of preferably rectangular cross section extending therethrough. The slot 34 is intersected by a transverse aperture 36 within which an adjusting nut 37 is freely supported in coaxial relation to slot 34. The blade 33 is preferably of elongated rectangular form and is slidably disposed within slot 34 while extending through the internally threaded aperture of nut 37. The longitudinal side edges of the blade are provided with pluralities of teeth 38 which engage the threads of the nut. When the nut is rotated, the blade is translated through the slot 34 to vary the amount the lower end of the blade projects from the lower end of the bracket. The lower end of the blade is provided with a sharpened cutting edge 39 inclined to the axis of the blade by an appropriate predetermined angle of, for example, approximately 45°.

The upper end of the carrier bracket 32 is provided with a shoulder portion 41 which is inclined relative to the axis of the bracket in the opposite direction from the blade cutting edge 39 and at a complementary angle relative thereto. Thus where the cutting edge is inclined at 45°, the shoulder portion 41 is oppositely inclined at 45°. Lugs 42, 43 respectively project longitudinally from the upper and lower ends of the shoulder portion 41 on opposite sides of the slot 34. The upper edge of lug 42 is inclined parallel to the shoulder portion. The outer side edge of lug 43 is slightly inset from the lower end of the shoulder portion, as indicated at 44, and is in right angular relation thereto. In addition, a notch 46 is provided in the outer side edge of lug 43 at its upper end, the lower notch edge being parallel to the shoulder portion and side edge of the notch being parallel to the side edge of the lug.

The above described arrangement of the lugs facilitates attachment of the cutting blade assembly 31 to shank 18 in several advantageous positions. With cap 29 loosened lug 43 may be inserted into the keyway to a position wherein the lower edge of notch 46 engages the upper edge of the keyway and the side edge of the notch engages the side edge of slot 27 as best shown in FIGURE 1. The lug 42 extends into the keyway to a position wherein the upper edge of the lug abuts the upper edge of the keyway forwardly of the slot. The shoulder portion 41 of the bracket now engages the underside of the shank and the bracket is rigidly retained in this position upon tightening the cap against the lug 42. The cutting blade assembly is now positioned for peripheral scoring of a conduit sheath, in which scoring position the cutting edge 39 of blade 33 is at right angles to the shank axis.

The cutting blade assembly may be alternatively secured to the shank in a longitudinal severing position. In this case, the outer side edge of lug 42 is engaged with the inner end edge 26 of the shank keyway 23, the upper edge of the lug abutting the upper edge of the keyway rearwardly of slot 27. The cap 29 is then tightened against the notch 46 of lug 43 to secure the blade assembly in longitudinal severing position as depicted in FIGURE 3. In this position the blade assembly is normal to the shank axis and the blade cutting edge is inclined relative thereto.

To strip a conduit with the stripping tool of the invention with cutting blade assembly 31 employed as the cutting blade means, the blade assembly is just secured in scoring position to the shank in the manner previously described. The adjusting nut 37 is appropriately rotated to adjust the projection of blade 33 from the underside of bracket 32 to an amount equal to the thickness of the sheath 12 of the conduit to be stripped. An initial incision is made into the sheath with the cutting edge of blade 33 and the undersurface of the bracket 32 and heel 21 of the offset portion of shank are placed in tangential abutment with the sheath exterior as shown in FIGURE 1. The handle 17 is then manipulated to draw the tool peripherally around the sheath, the cutting blade in turn scoring the sheath but not penetrating sufficiently therethrough to cut or abrade the inner tubes 13. The blade assembly is now reversed and secured in longitudinal severing position. The point of the blade is inserted into the peripherally scored cut and the tool pushed longitudinally along the sheath away from the user. The blade hence longituding severs the sheath whereby it may be readily stripped from the inner tubes.

Considering now an alternative form of blade configuration which may be employed as the blade means 16, the numeral 47 depicts such a blade as illustrated in FIGURES 4, 5 and 6. The blade 47 includes a generally rectangular body 48 having one side bevelled to form a cutting edge 49. The lower edge of the body is inclined away from cutting edge 49 and formed with laterally projecting flanges 51 which project beyond the opposite sides of the blade, particularly the cutting edge side thereof. The flanges 51 are rounded at their ends and convexly curved transversely to define a shoe with a toe portion 52 adjacent the cutting edge and a heel portion 53 adjacent the opposite side edge of the body. It is of importance to note that the cutting edge includes an outwardly curved portion 54 at its lower end which approaches the tip of toe portion 52 to preferably terminate in a shallow stepped edge 56 which merges with the toe portion at a point spaced from its tip. In addition, the side edges of the blade body 48 are outwardly flared at their upper ends as shown at 57, 58 to facilitate attachment to the shank 18. With the flared portion 57 on the cutting edge side of the blade engaging the inner end edge 26 of the shank keyway 23 and the upper edge of the blade body engaging the upper edge of the keyway, the cap 29 may be tightened against flared portion 58 to secure the blade to the shank. When thus secured in position, the sides of the blade body are substantially normal to the shank axis while the shoe is at an acute angle relative thereto.

In the use of the stripping tool employing the blade 47, the toe portion 52 is first inserted into an incision in the conduit sheath previously made as by means of the blade assembly 31. The upper surface of the toe portion is engaged flush with the interior surface of the sheath by positioning the tool such that the shank is inclined from the sheath periphery. It is of extreme importance to note that when the tool is so positioned the heel portion 53 of the shoe, as well as the entire shoe undersurface, urges the inner tube 12 away from the sheath (see FIGURE 4) as the blade is pulled longitudinally of the conduit. Moreover, the curved portion 54 of the cutting edge 49 causes the sheath to be served from the inside out. Thus the combined effect is to completely eliminate any possibility of the blade being positioned in cutting engagement with the inner tubes during stripping.

A further modified form of blade means 61 especially employed for making peripheral cuts in the sheath is illustrated in FIGURE 7. Such means comprises a carrier block or bracket 62 in which is mounted a depending blade member 63 having opposite cutting edges 64 and 66. The lower end of the blade 63 terminates in a downwardly curved arcuate shoe 68 which projects laterally from the opposite side faces of the upper portions of the blade member. The shoe additionally extends beyond the cutting edge sides of the member so as to define a pair of toe portions 69 and 70 adjacent the respective cutting edges 64 and 66. Each cutting edge is curved outwardly to smoothly merge with the corresponding toe portion. The carrier bracket 62 is provided with a tapered slot 73 adapted to receive the upper portion of the blade member, and a pair of screws 74 are threadably held in the bracket respectively adjacent the upper and lower ends of the slot and extending through the opposite side walls thereof. As thus arranged the set screws engage opposite sides of the blade member so as to adjust the inclination thereof within the slot as desired to facilitate the most expeditious cutting of sheaths of different diameters. In use since the blade member is provided with opposite cutting edges, the tool may be moved around the sheath partially or completely in either direction to effect circumferential cutting thereof as may be desired.

When not in use the various blade means of the stripping tool may be conveniently stored in the hollow handle 17.

What is claimed is:

1. A conduit stripping tool comprising a shank with handle means at one end, a carrier bracket secured to the opposite end of said shank and depending therefrom, said bracket having a bore longitudinally therethrough and a transverse aperture intersecting said bore, an adjusting nut disposed within said aperture, and having a threaded bore and a blade disposed within said bracket bore and extending through the threaded bore of said nut, said blade having teeth along its side engaging the threads of said nut, said blade having a cutting edge adjacent its lower end.

2. A conduit stripping tool according to claim 1, further defined by said cutting edge being inclined between the opposite sides of said blade at its lower end.

3. A conduit stripping tool according to claim 1, wherein said shank has an offset portion intermediate its length with a rounded corner adjacent said bracket defining a bearing heel.

4. A conduit stripping tool comprising a shank with handle means at one end, a generally rectangular carrier bracket having a longitudinally extending rectangular bore therethrough and a transverse aperture intersecting the bore, means for securing said bracket to the opposite end of said shank from said handle means in one of a pair of selectable positions wherein the bracket axis is respectively normal to the shank axis and inclined at a predetermined angle to the shank axis, an adjusting nut freely disposed within said aperture with its internally threaded bore coaxial with said bore through said bracket, and an elongated rectangular blade disposed within the bracket bore and nut bore, said blade having teeth along its opposite side edges in engagement with the threads of said nut, said blade having a cutting edge at its distal end relative to said shank inclined between the side edges of the blade at an angle complementary to said predetermined angle.

References Cited in the file of this patent

UNITED STATES PATENTS

| | | |
|---|---|---|
| 2,385,368 | Montgomery | Sept. 25, 1945 |
| 2,538,453 | Harkins | Jan. 16, 1951 |
| 2,691,822 | Vaughan | Oct. 19, 1954 |
| 2,830,366 | Chisena | Apr. 15, 1958 |
| 2,875,516 | Parks | Mar. 3, 1959 |

FOREIGN PATENTS

| | | |
|---|---|---|
| 257,550 | Switzerland | Apr. 1, 1949 |